(12) United States Patent
Ursino et al.

(10) Patent No.: US 12,531,477 B2
(45) Date of Patent: Jan. 20, 2026

(54) POWER CONVERTER/TRANSFORMER ASSEMBLY AND CURRENT BALANCE

(71) Applicant: Infineon Technologies Austria AG, Villach (AT)

(72) Inventors: Mario Ursino, Villach (AT); Roberto Rizzolatti, Villach (AT)

(73) Assignee: Infineon Technologies Austria AG, Villach (AT)

( * ) Notice: Subject to any disclaimer, the term of this patent is extended or adjusted under 35 U.S.C. 154(b) by 278 days.

(21) Appl. No.: 18/093,153

(22) Filed: Jan. 4, 2023

(65) Prior Publication Data

US 2024/0223089 A1 Jul. 4, 2024

(51) Int. Cl.
*H02M 3/00* (2006.01)

(52) U.S. Cl.
CPC .................................. *H02M 3/01* (2021.05)

(58) Field of Classification Search
CPC ......... H02M 3/33507; H02M 3/33573; H02M 3/33576; H02M 3/01
See application file for complete search history.

(56) References Cited

U.S. PATENT DOCUMENTS

| | | | | |
|---|---|---|---|---|
| 2006/0220972 | A1* | 10/2006 | Saitoh | H03H 7/427 343/722 |
| 2020/0343040 | A1* | 10/2020 | Rizzolatti | H01F 27/306 |
| 2021/0184586 | A1* | 6/2021 | Jin | H02M 3/158 |
| 2021/0288576 | A1* | 9/2021 | Rizzolatti | H02M 1/007 |
| 2023/0017789 | A1* | 1/2023 | Cobos Marquez | H01F 27/29 |

FOREIGN PATENT DOCUMENTS

| | | |
|---|---|---|
| CN | 111312501 A | 6/2020 |
| EP | 3734826 A1 | 11/2020 |
| JP | 2006060688 A * | 3/2006 |
| JP | 2006287577 A * | 10/2006 |
| WO | WO-2021101350 A1 * | 5/2021 |

OTHER PUBLICATIONS

Translation of WO2021101350A1 by Clarivate Analytics on Mar. 4, 2025, 41 pages.*
Machine translation of JP2006287577 by Clarivate Analytics, May 2025, 24 pages.*
Machine translation of JP2006060688 by Clarivate Analytics, May 2025, 23 pages.*
Extended Search Report, EP 23 21 8713, May 24, 2024, pp. 1-16.
Li, Cheng, et al., "Analysis of a 48V-12V Hybrid Switched Capacitor Converter with DC Winding Current Autotransformer", 2020 IEEE 21st Workshop on Control and Modeling for Power Electronics (Compel), IEEE, Nov. 9, 2020 (Nov. 9, 2020), pp. 1-7, XP033866852.

* cited by examiner

*Primary Examiner* — Harry R Behm
(74) *Attorney, Agent, or Firm* — Armis IP Law, LLC

(57) ABSTRACT

An apparatus such as a power converter includes a transformer assembly, a first series circuit path, and a second series circuit path. The transformer assembly includes multiple windings such as a first winding and a second winding. The first series circuit path includes a first circuit component disposed in series with a first winding of the multiple windings; the second series circuit path including a second circuit component disposed in series with a second winding of the multiple windings. The first series circuit path is connected in parallel with the second series circuit path.

19 Claims, 15 Drawing Sheets

POWER CONVERTER/TRANSFORMER ASSEMBLY AND CURRENT BALANCE

BACKGROUND

Data centers such as operated by Google™, Facebook™, and others provide indispensable services for our society. The energy consumption for all data centers worldwide is around 2% of overall electric energy usage. Therefore, datacenter providers are constantly looking to improve the efficiency of power conversion in order to save energy or to be able to increase the CPU/GPU/ASIC, etc., power of servers in existing data centers. Machine learning and artificial intelligent architectures require very powerful GPUs or custom designed ASICs to meet the required calculation power.

Nowadays most of the digital load are powered from a 12 V bus directly with a single stage multiphase buck topology, so called voltage regulator module (VRM). However, with the increase of power demand at a digital load, conduction losses at 12V bus bar are becoming an important bottleneck, therefore 48V architecture has been proposed in the recent years.

Operating the system with 40-V to 60-V input voltage bus instead of 12-V bus offers serval advantages.

For example, a first stage converts a high input voltage down to an intermediate voltage. This first stage can be an unregulated or regulated, high efficient and densely steps down converter so called intermediate bus converter (IBC). A second stage is based on the common buck converter with very good transient response and high efficiency.

Covering a wide input range from 40V to 60V with a 4:1 fixed-ratio converter results in a Vout change from approximately 9-V to 15-V, which provides a good combination of efficiency and dynamic performance.

According to conventional techniques, a respective power supply includes a transformer of multiple windings to convert a respective input voltage into an output voltage power load. In certain instances, a conventional transformer may include a stack of many windings. The amount of current through each of the windings may vary depending upon a respective height of the windings in the stack.

BRIEF DESCRIPTION

Implementation of clean energy (or green technology) is very important to reduce our impact as humans on the environment. In general, clean energy includes any evolving methods and materials to reduce an overall toxicity on the environment from energy consumption.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, wireless base stations, etc. In certain instances, energy is stored in a respective one or more battery resource. Alternatively, energy is received from a voltage generator. Regardless of whether energy is received from green energy sources or non-green energy sources, it is desirable to make most efficient use of raw energy (such as storage and subsequent distribution) provided by such systems to reduce our impact on the environment. This disclosure contributes to reducing our carbon footprint and better use of energy via more efficient energy conversion.

This disclosure further includes the observation that power conversion efficiency of conventional power supplies can be improved. For example, to this end, this disclosure includes novel ways of providing improved performance of power conversion via implementation of a novel power converter assembly and/or corresponding transformer assembly to provide improved current sharing amongst parallel windings in the transformer assembly. The son as discussed herein may include interleaved windings as well as external circuit connectivity modifications to decrease current mismatch amongst the windings.

More specifically, this disclosure includes an apparatus including a transformer assembly. The transformer assembly includes multiple windings. The apparatus further includes a first series circuit path and a second circuit path connected in parallel. The first circuit path includes a first circuit component disposed in series with a first winding of the multiple windings; a second series circuit path includes a second circuit component disposed in series with a second winding of the multiple windings.

As further discussed herein, the first winding may be magnetically coupled to the second winding via a core of magnetic permeable material disposed in the transformer assembly.

The first circuit component may be a first capacitor; wherein the second circuit component may be a second capacitor. In such an instance, a capacitance of the first capacitor may be substantially the same as a capacitance of the second capacitor.

The first series circuit path can be configured to include a first resonant circuit, the first circuit component disposed in the first resonant circuit; the second series circuit path can be configured to include a second resonant circuit, the second circuit component disposed in the second resonant circuit.

Yet further, as discussed herein, the apparatus can be configured to include a substrate or multiple substrates (one or more substrates); each of the multiple windings of the transformer assembly can be configured to reside in a respective layer of the substrate. The first circuit component and the second circuit component may be affixed to the substrate. The apparatus can be configured to include a power converter circuit fabricated on the substrate; the first circuit component may be a first capacitor of the power converter circuit; the second circuit component may be a second capacitor of the power converter circuit. Multiple substrates can be used when, for example, implementing a system with a discrete autotransformer within which windings are built in different substrates (for cost reasons). Such an autotransformer fabricated from multiple layers of circuit board substrate is then made as SMD/TH component which is finally connected to the resonant capacitors.

Still further, as discussed herein, the transformer assembly may be an auto-transformer assembly.

The apparatus can be configured to include a third circuit component disposed in the first series circuit path. The first winding may be disposed between the first circuit component and the third circuit component. The apparatus may be configured to include a fourth circuit component disposed in the second series circuit path, the second winding disposed between the second circuit component and the fourth circuit component.

In further examples as discussed herein, the apparatus can be configured to include a substrate to which the transformer assembly is affixed. The substrate may include a first circuit node and a second circuit node. The first series circuit path may be connected between the first circuit node and the second circuit node; the second series circuit path may be connected between the first circuit node the second circuit node. The first circuit node and the second circuit node can be configured to connect the first circuit path and the second circuit path in parallel. Yet further, the apparatus as discussed herein can be configured to include a first electrically conductive path disposed in the first series circuit path. The first electrically conductive path can be configured to extend from a third node of the substrate to a first layer of the transformer assembly in which the first winding resides. A second electrically conductive path may be disposed in the second series circuit path. The second electrically conductive path can be configured to extend from a fourth node of the substrate to a second layer of the transformer assembly in which the second winding resides. The first electrically conductive path may be implemented independent of the second electrically conductive path.

In still further examples, the transformer assembly as discussed herein can be configured to include a third winding magnetically coupled to the first winding and the second winding; the third winding may be disposed in a layer of the transformer between the first winding and the second winding.

The transformer assembly as discussed herein can be configured to include N windings magnetically coupled to each other via a common magnetic core of the transformer assembly, where N is greater than 3 or 4 or 5 or 6 or 7 or 8 or 9 or and/or, and so on. For example, the transformer assembly can be configured to include M windings disposed between the first winding and the second winding, where M is greater than 2.

In still further examples, the apparatus as discussed herein is a power converter or power converter assembly operative to convert a DC input voltage into a DC output voltage.

Yet further, note that the apparatus as discussed herein can be configured to include: i)
  a third series circuit path including a third circuit component disposed in series with a third winding of the multiple windings; ii) fourth series circuit path including a fourth circuit component disposed in series with a fourth winding of the multiple windings. The fourth series circuit path can be connected in parallel with the third series circuit path external to the transformer assembly. The transformer assembly as discussed herein can be configured to include a fifth winding and a sixth winding connected in series. For example, the fifth winding may be is directly coupled to the first winding and the second winding; the sixth winding may be directly coupled to the third winding and the fourth winding.

This disclosure further includes a method comprising: receiving a transformer assembly including multiple windings; fabricating a power converter circuit to include: a first series circuit path including a first circuit component disposed in series with a first winding of the multiple windings; and a second series circuit path including a second circuit component disposed in series with a first winding of the multiple windings, the first series circuit path being connected in parallel with the second series circuit path.

The method may further include fabricating the power converter circuit to include: i) a third circuit component disposed in the first series circuit path, the first winding disposed between the first circuit component and the third circuit component, and ii) a fourth circuit component disposed in the second series circuit path, the second winding disposed between the second circuit component and the fourth circuit component.

Note that this disclosure includes useful techniques. For example, in contrast to conventional techniques, the novel power supply as described herein provides high efficiency of converting an input voltage to a respective output voltage via unique circuitry and corresponding connectivity with windings in a transformer assembly.

Note that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

Figure 1:
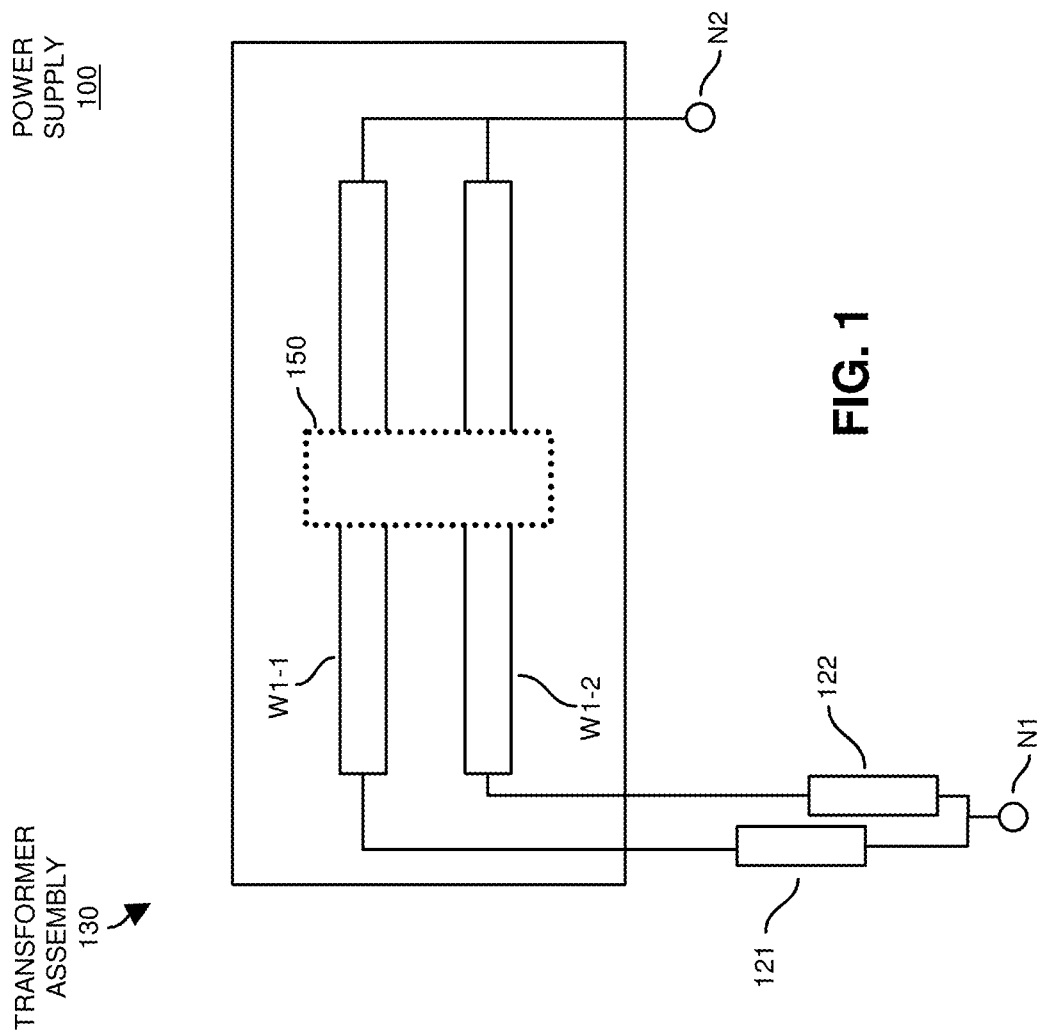
FIG. 1 is an example diagram illustrating implementation of circuitry and a corresponding transform assembly as described herein.

The foregoing and other objects, features, and advantages of the disclosed matter herein will be apparent from the following more particular description herein, as illustrated in the accompanying drawings in which like reference characters refer to the same parts throughout the different views. The drawings are not necessarily to scale, with emphasis instead being placed upon illustrating the principles, concepts, aspects, techniques, etc.

DETAILED DESCRIPTION

As previously discussed, this disclosure is useful over conventional techniques. For example, in contrast to conventional techniques, the novel power supply as described herein provides high efficiency of converting an input voltage to a respective output voltage via a unique power supply circuit implementation using a transformer assembly. The novel method, apparatus, system, circuitry, etc., as discussed herein reduces an imbalance of respective current flowing through different transformer winding of a respective transformer assembly.

As an example, an apparatus such as a power converter as discussed herein may include a transformer assembly, a first series circuit path, and a second series circuit path. The transformer assembly may include multiple windings such as a first winding and a second winding. The first series circuit path may include a first circuit component disposed in series with a first winding of the multiple windings; the second series circuit path may include a second circuit component disposed in series with a second winding of the multiple windings. The first series circuit path may be connected in parallel with the second series circuit path.

Figure 2:
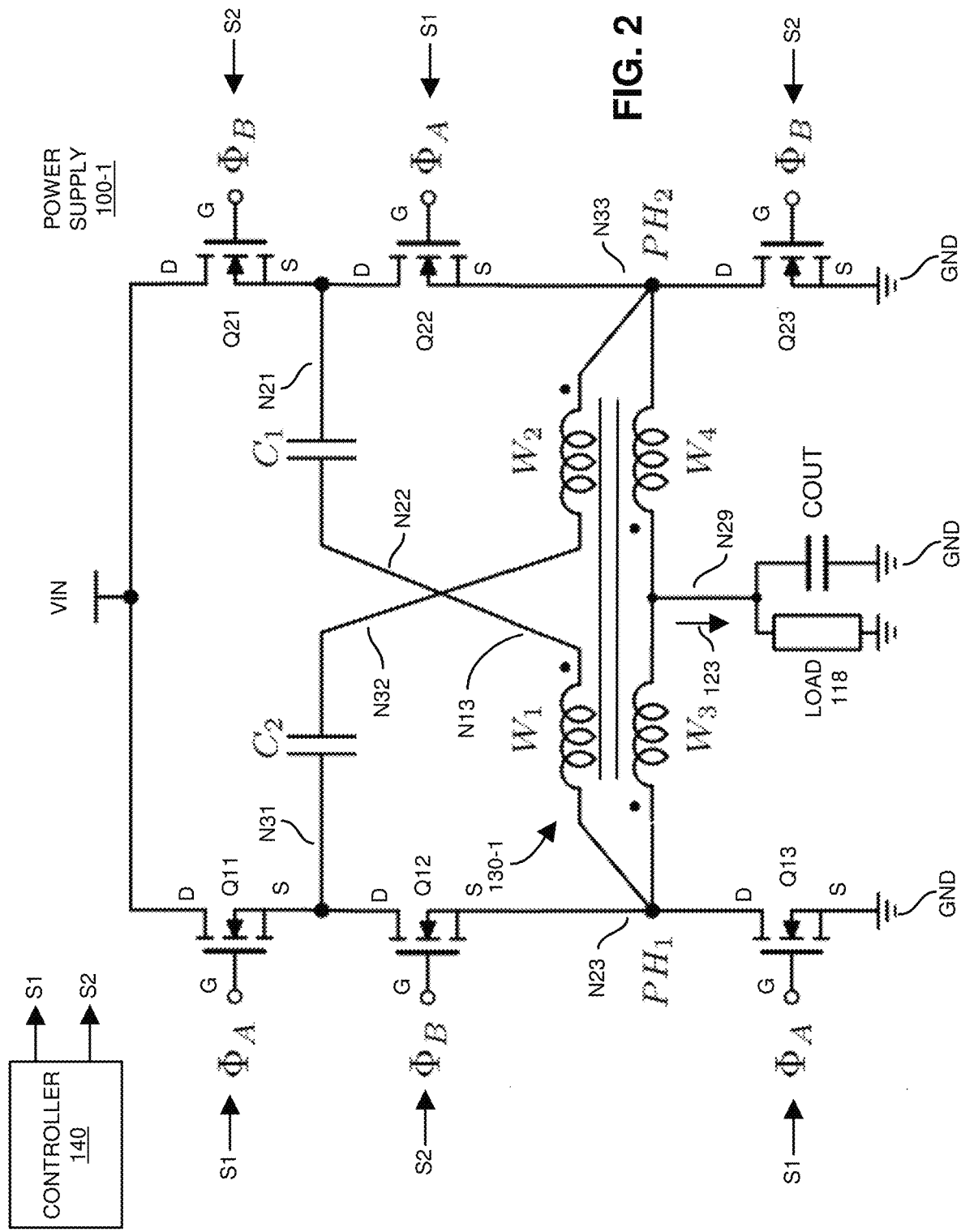
FIG. 2 is an example diagram illustrating implementation of a power converter as described herein.

Our aim is to improve HSCs autotransformer copper utilization in paralleled windings, where this autotransformer is always implemented in a planar structure. In detail, this is an autotransformer where each turn is not a physical wire but instead a (wide) copper trace, as shown in FIG. 2. This approach is beneficial to decrease overall losses, as planar windings have a strongly reduced copper resistance at high frequency with respect to classical wire. The winding pack is therefore constructed as a high-performance PCB (thick copper, small clearances). In this disclosure, we include a single-turn planar transformers for application relevancy, but all the ideas can be extended to multi-turn and/or wire-wound autotransformers.

Now, more specifically, FIG. 1 is an example diagram illustrating a regulated voltage converter including multiple flying capacitors as described herein.

As shown in FIG. 1, power supply 100 includes transformer assembly 130 as well as corresponding circuitry 121 and circuitry 122. The transformer assembly 130 includes winding W1-1 and winding W1-2. Magnetic permeable material 150 provides magnetic or inductive coupling between the winding W1-1 and the winding W1-2. Thus, the first winding W1-1 is magnetically coupled to the second winding W1-2 via a core of magnetic permeable material 150 disposed in the transformer assembly 130.

Thus, in this example, the power supply 100 (such as an apparatus, circuit, etc.) includes transformer assembly 130 including multiple windings such as winding W1-1, W1-2, etc. The power supply 100 includes a first series circuit path including first circuitry 121 (such as one or more components) disposed in series (via one or more electrically conductive paths) with a first winding W1-1 of the transformer assembly 130. The power supply 100 further includes a second series circuit path including second circuitry (such as one or more circuit components) disposed in series (via one or more electrically conductive paths) with a second winding W1-2 of the multiple windings. The first series circuit path is connected in parallel with the second series circuit path between node N1 and node N2.

Further variations of the novel transformer assembly and corresponding circuit connectivity to power supply 100 are discussed below.

FIG. 2 is an example diagram illustrating implementation of a power converter as described herein.

One aspect of this disclosure is to provide different transformer types with improved AC resistance in a hybrid switched-capacitor converter topology such as power supply 100-1. In general, as discussed herein, splitting the resonant branch (of a respective resonant circuit) into multiple resonant branches (resonant circuits in parallel) has a positive impact in the overall transformer efficiency associated with transformer assembly 130-1.

In this example, the transformer assembly 130-1 (such as an auto-transformer or other type of transformer) includes windings W1, W2, W3, and W4. Each of the windings is magnetically (inductively) coupled to each other.

Further in this example, the power supply 100-1 includes switches Q11, Q12, Q13, Q21, Q22, and Q23. The switches Q11, Q12, and Q13 are connected in series between the input voltage node receiving the input voltage Vin (such as a DC input voltage) and ground reference node GND. The switches Q21, Q22, and Q23 are connected in series between the input voltage node receiving the input voltage Vin (such as a DC input voltage) and ground reference node GND.

The drain node (D) of switch Q11 is connected to the input voltage source receiving input voltage Vin. The source node (S) of switch Q11 is connected to the drain node (D) of switch Q12. The source node (S) of switch Q12 is connected to the drain node (D) of switch Q13. The source node (S) of switch Q13 is connected to ground (GND potential).

The drain node (D) of switch Q21 is connected to the input voltage source receiving input voltage Vin. The source node (S) of switch Q21 is connected to the drain node (D) of switch Q22. The source node (S) of switch Q22 is connected to the drain node (D) of switch Q23. The source node (S) of switch Q23 is connected to ground (GND potential).

Still further, power supply 100-1 includes a first resonant circuit (a.k.a., resonant circuit path) such as a series combination of capacitor C1 and winding W1 disposed between node N21 and node N23. Node N22 provides connectivity between the capacitor C1 and the winding W1.

Power supply 100-1 includes a second resonant circuit (a.k.a., resonant circuit path) such as a series combination of capacitor C2 and winding W2 disposed between node N31 and node N33. Node N32 provides connectivity between the capacitor C2 and the winding W2.

During operation, the power supply 100-1 receives input voltage Vin and converts it into the output voltage 123. For example, the controller 140 produces control signals S1 and S2. Signal S1 drives: i) the gate node (G) of the switch Q11, ii) the gate node (G) of the switch Q13, and iii) the gate node (G) of the switch Q13.

Thus, the power supply 100-1 can be configured as a power converter operative to convert a DC input voltage (such as Vin) into a (DC) output voltage 123.

Figure 3:
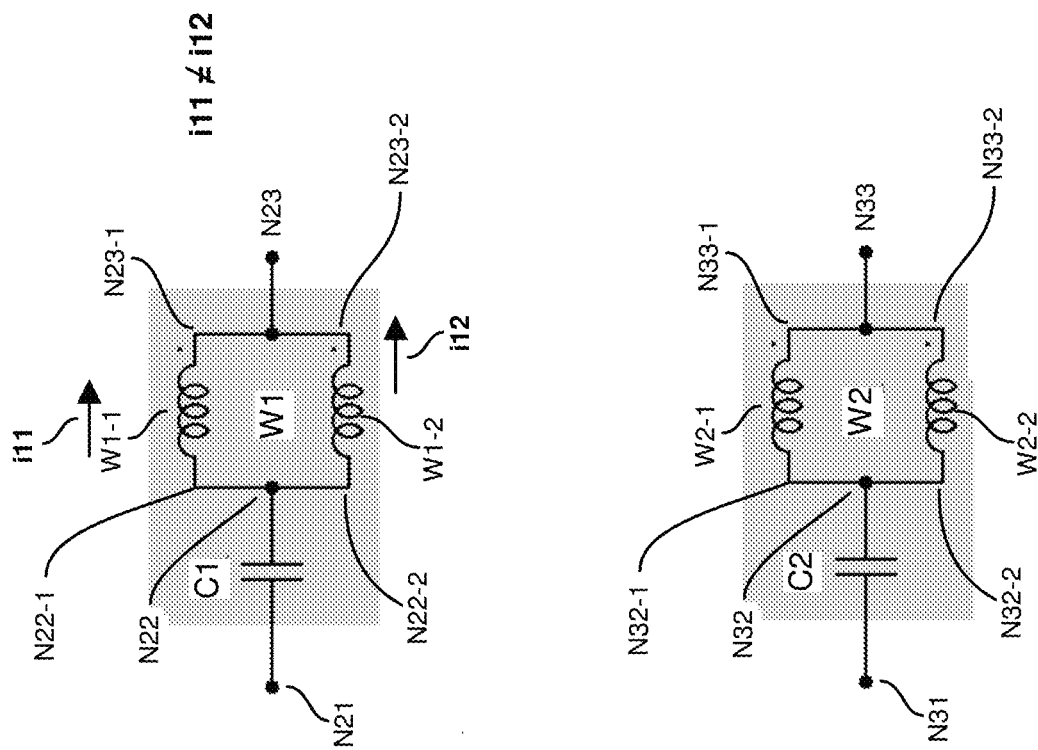
FIG. 3 is an example diagram illustrating power converter circuitry as described herein.

FIG. 3 is an example diagram illustrating power converter circuitry as described herein.

In this example, the winding W1 of the example power supply 100-1 is implemented as parallel connectivity of winding W1-1 and W1-2. For example, the capacitor C1 is connected between node N21 and node and node N22. The winding W1 includes winding W1-1 connected in parallel with the winding W1-2 between node N22 and node N23.

Further in this example, the winding W2 of the example power supply 100-1 is implemented as parallel connectivity of winding W2-1 and W2-2. For example, the capacitor C2 is connected between node N31 and node and node N32. The winding W2 includes winding W2-1 connected in parallel with the winding W2-2 between node N32 and node N33.

Figure 4:
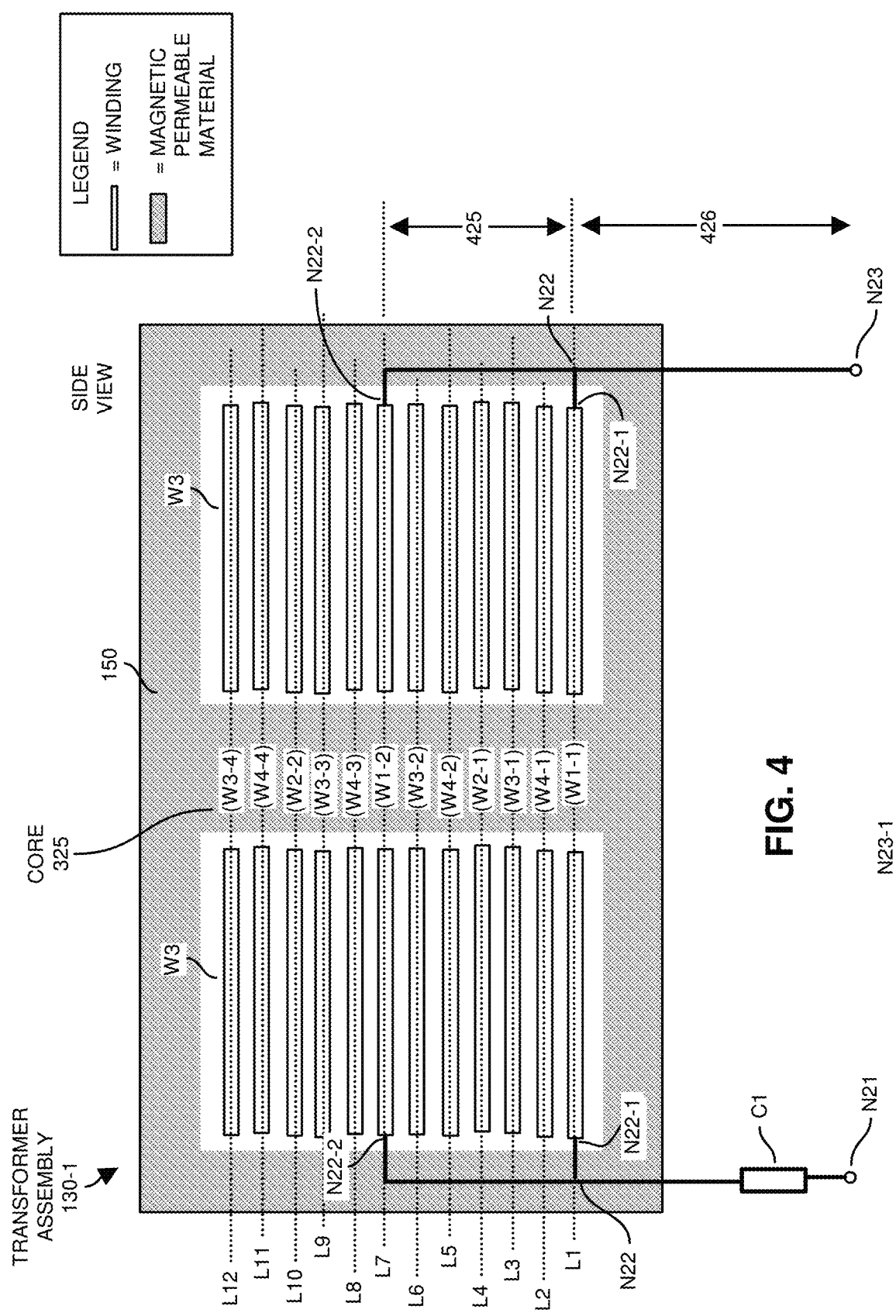
FIG. 4 is an example side view diagram illustrating different layers of a transformer assembly and conductivity to corresponding power converter circuitry as described herein.

Implementation of the transformer assembly 130-1 and corresponding circuitry such as a combination of resonant circuit such as capacitor C1 and winding W1) as well as a combination of resonant circuit such as capacitor C2 and winding W2 is shown FIG. 4.

FIG. 4 is an example side view diagram illustrating different layers of a transformer assembly and connectivity to corresponding power converter circuitry as described herein.

This example configuration of the transformer assembly 130-1 and the corresponding connectivity of capacitor C1 to the winding W1 (such as parallel combination of winding W1-1 and W1-2) results in a mismatch of current flowing through the each of the windings W1-1 and W1-2 because of the difference in path length (such as length 425) between node N22 and each of the windings W1-1 and W1-2. More specifically, the electrically conductive path between the node N22-2 (of winding W1-2) and capacitor C1 is longer by length 425 than the electrically conductive path between the node N22-1 (of winding W1-1) and capacitor C1. This means that there is an impedance mismatch in the circuit path between the capacitor C1 and the winding W1-2 and the circuit path between the capacitor C1 and the winding W1-1. For example, the extra length 425 results in additional inductance, and/or resistance, which is undesirable, especially at higher switching frequencies.

In this example, the magnitude of current iii through the winding W1-1 is greater than the magnitude of current i12 through the winding W1-2. A solution to the undesirable mismatch of current through windings is addressed in the subsequent FIGS. 6-15 and corresponding text.

Figure 5:
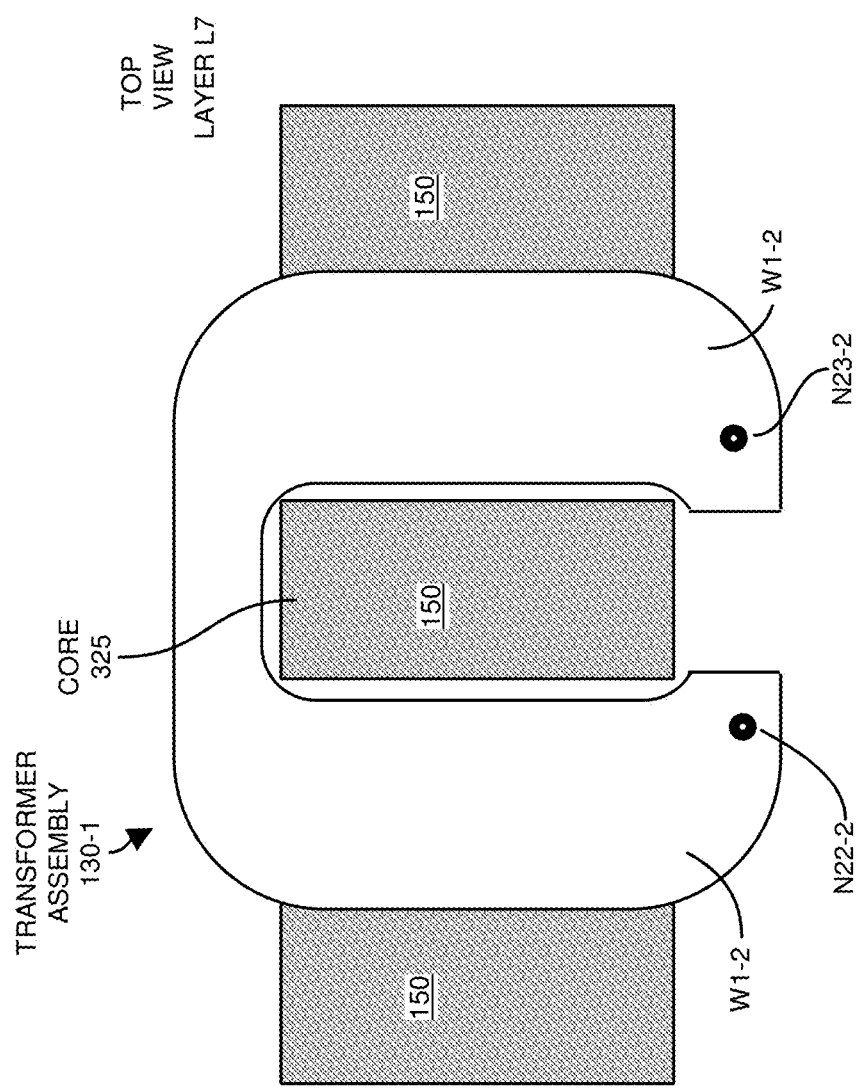
FIG. 5 is an example top view diagram of a winding in a transformer assembly as described herein.

FIG. 5 is an example top view diagram of a winding in a transformer assembly as described herein.

In this example, the winding W1-2 at layer L7 of the transformer assembly 130-1 is wrapped around the core 325 of magnetic permeable material 150. Note that the winding W1-2 includes a single turn. However, each of the windings in transformer assembly 130-1 can be any number of turns. Each of the windings as discussed herein can be configured in a similar manner at each of the different layers of the transformer assembly 130-1.

Figure 6:
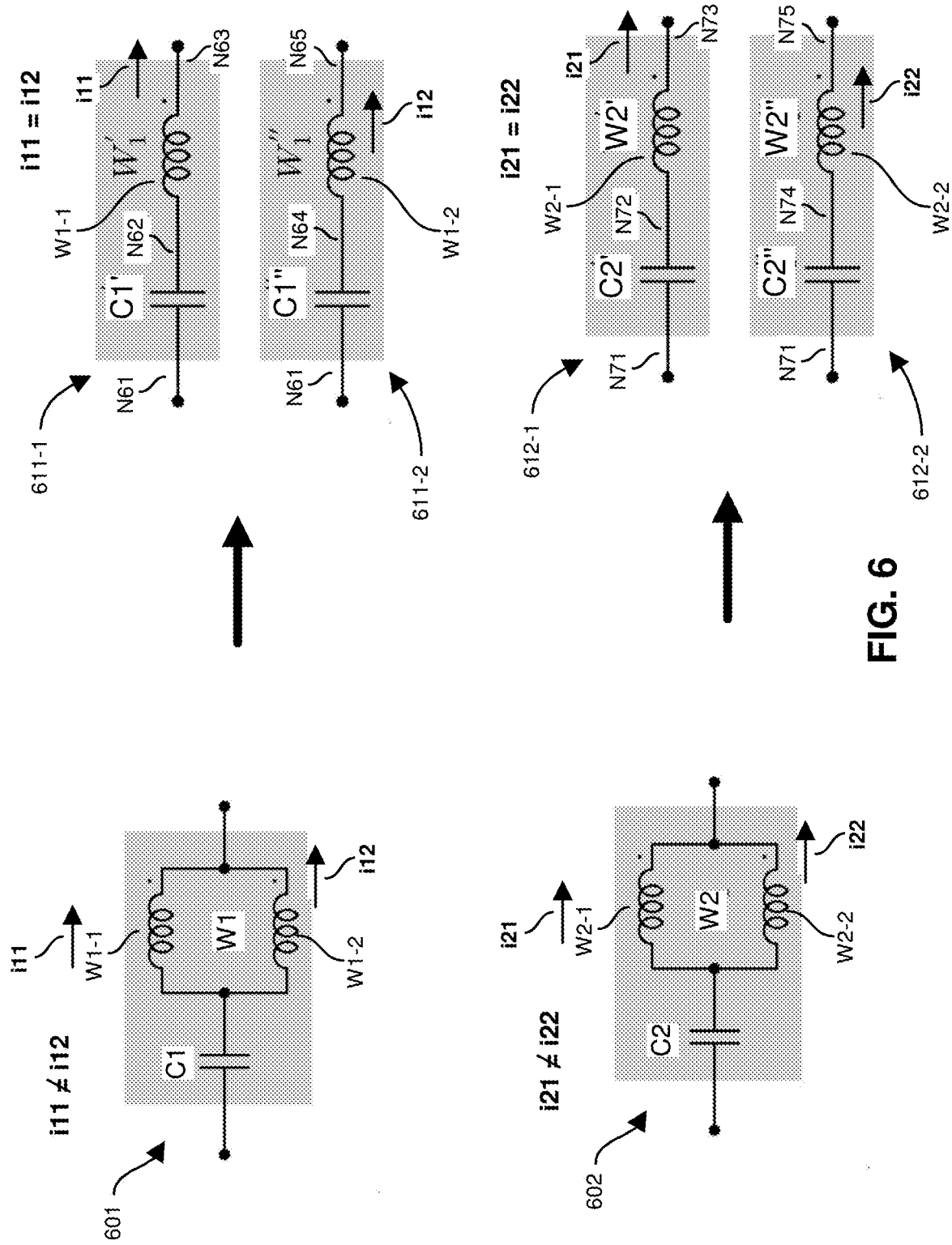
FIG. 6 is an example diagram illustrating split implementation of a respective resonant circuit as described herein.

FIG. 6 is an example diagram illustrating split implementation of a respective resonant circuit as described herein.

In this example, the unique connectivity as discussed herein demonstrates that it is possible to improve current sharing among parallel circuit paths by splitting resonant capacitors and assigning one to each winding. For example, as previously discussed, the circuit path including C1 and winding can be implemented via a single capacitor C1. In this alternative implementation, the capacitor C1 is implemented as two capacitors C1' (or first circuit component) and C1" (or second circuit component).

In such an instance, from the qualitative point of view, the current divider Z_0/Z_1 (where Z0 is impedance between capacitor C1 and the node N22-1, and where Z1 is the impedance of the extra length 425 of electrically conductive path between node N22 and node N22-2) is moved from winding-level to resonant-branch-level. At resonance, the winding impedance mismatch is now only a fraction of the total branch impedance, while in the classical case the divider fully depends only on the winding impedance mismatch.

In particular, the following criteria describe this approach: A non-isolated, autotransformer-based DC-DC power converter contains two or more resonant branches B_x, where each B_x is defined as a circuit branch where: an LC-series resonance is observed at certain converter switching frequency, which is characterized by sinusoidal current inside the branch; the inductive energy is associated with the leakage inductance L_k of the autotransformer, i.e., each equivalent inductor is an autotransformer winding W_x; the capacitive energy is stored into a capacitor C_x.

Two or more resonant branches, composed by the series of one capacitive element and one autotransformer winding, occupy the same topological position.

For example, the capacitor C1 is split into capacitor C1' and capacitor C1". A capacitance of capacitor C1' is substantially half the capacitance of capacitor C1; a capacitance of capacitor C1" is substantially half the capacitance of capacitor C1. Thus, capacitor C1' and C1" are approximately equal capacitance.

The series circuit path 611-1 includes a resonant circuit such as a series connection of the capacitor C1' and the winding W1-1; the series circuit path 611-2 includes a resonant circuit such as a series connection of the capacitor C1" and the winding W1-2, replacing series circuit path 601.

The series circuit path 612-1 includes a resonant circuit such as a series connection of the capacitor C2' and the winding W2-1; the series circuit path 612-2 includes a resonant circuit such as a series connection of the capacitor C2" and the winding W2-2, replacing series circuit path 602.

Figure 7:
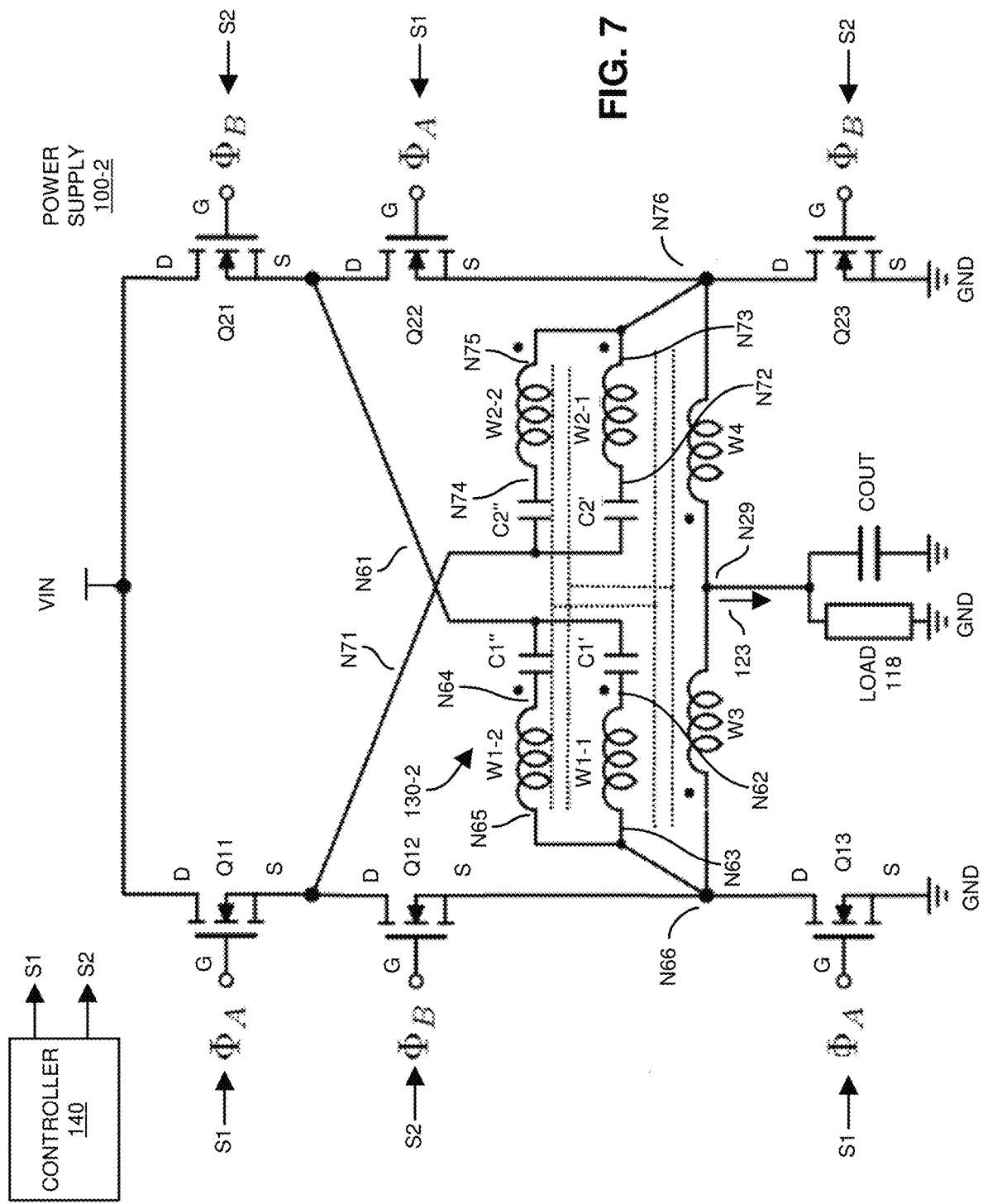
FIG. 7 is an example diagram illustrating a power converter circuitry implementing the split resonant circuit as described herein.

FIG. 7 is an example diagram illustrating power converter circuitry implementing the split resonant circuit as described herein.

In this example, the transformer assembly 130-2 (such as an auto-transformer or other type of transformer) includes windings W1-1, W1-2, W2-1, W2-2, W3, and W4. Each of the windings is magnetically (inductively) coupled to each other.

Further in this example, the power supply 100-2 includes switches Q11, Q12, Q13, Q21, Q22, and Q23. The switches Q11, Q12, and Q13 are connected in series between the input voltage node receiving the input voltage Vin (such as a DC input voltage) and ground reference node GND. The switches Q21, Q22, and Q23 are connected in series between the input voltage node receiving the input voltage Vin (such as a DC input voltage) and ground reference node GND.

The drain node (D) of switch Q11 is connected to the input voltage source receiving input voltage Vin. The source node (S) of switch Q11 is connected to the drain node (D) of switch Q12. The source node (S) of switch Q12 is connected to the drain node (D) of switch Q13. The source node (S) of switch Q13 is connected to ground (GND potential).

The drain node (D) of switch Q21 is connected to the input voltage source receiving input voltage Vin. The source node (S) of switch Q21 is connected to the drain node (D) of switch Q22. The source node (S) of switch Q22 is connected to the drain node (D) of switch Q23. The source node (S) of switch Q23 is connected to ground (GND potential).

Still further, power supply 100-2 includes multiple resonant circuits such as a first resonant circuit (a.k.a., resonant circuit path) including a series combination of capacitor C1' and winding W1-1 disposed between node N61 and node N63. Node N62 provides connectivity between the capacitor C1' and the winding W1-1. Power supply 100-2 further includes a second resonant circuit (a.k.a., resonant circuit path) such as a series combination of capacitor C1" and winding W1-2 disposed between node N61 and node N65. Node N64 provides connectivity between the capacitor C1" and the winding W1-2. The first resonant circuit is connected in parallel with the second resonant circuit.

Power supply 100-2 includes a third resonant circuit (a.k.a., resonant circuit path) such as a series combination of capacitor C2' and winding W2-1 disposed between node N71 and node N73. Node N72 provides connectivity between the capacitor C2' and the winding W2-1. Power supply 100-2 further includes a fourth resonant circuit (a.k.a., resonant circuit path) such as a series combination of capacitor C2" and winding W2-2 disposed between node N71 and node N75. Node N74 provides connectivity between the capacitor C2" and the winding W2-2. The third resonant circuit is connected in parallel with the fourth resonant circuit.

During operation, the power supply 100-2 receives input voltage Vin and, based on control signals generated by the controller 140, converts the input voltage Vin into the output voltage 123. For example, the controller 140 produces control signals S1 and S2. Signal S1 drives: i) the gate node (G) of the switch Q11, ii) the gate node (G) of the switch Q13, and iii) the gate node (G) of the switch Q13.

Thus, the power supply 100-2 can be configured as a power converter operative to convert a DC input voltage (such as Vin) into a (DC) output voltage 123.

Figure 8:
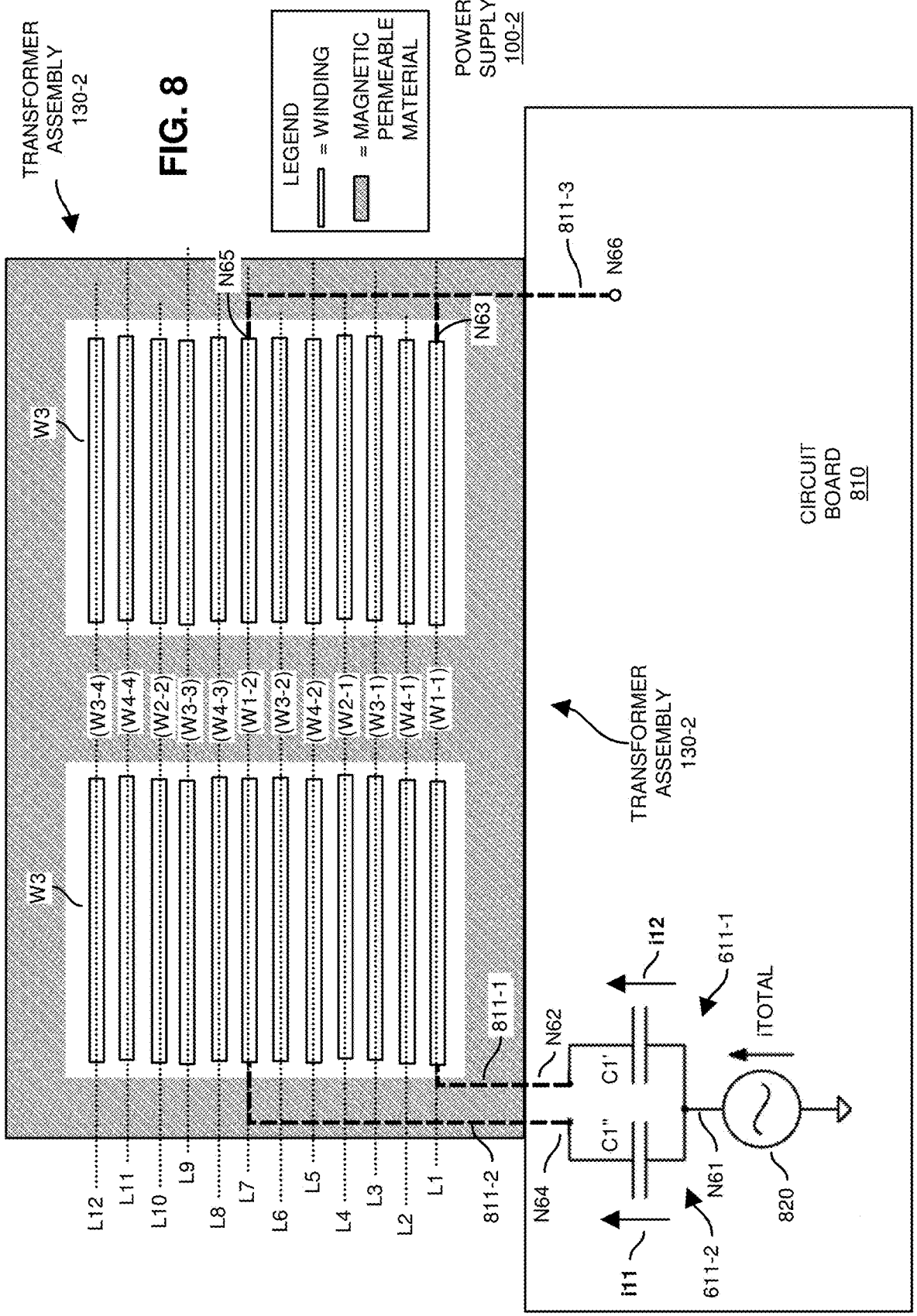
FIG. 8 is an example side view diagram of a transformer assembly and corresponding conductivity to power converter circuitry as described herein

FIG. 8 is an example side view diagram of a transformer assembly and corresponding conductivity to power converter circuitry as described herein In this example, the power supply 100-2 and corresponding components are affixed to the circuit board 810 (a.k.a., substrate). The transformer assembly 130-2 is coupled to the circuit board 810 (such as in FIG. 11) or the windings of the transformer assembly 130-2 may be fabricated in the circuit board 810 (such as in FIG. 12).

Further, as shown in FIG. 8, the circuit path 611-1 includes an electrically conductive path 811-1 between the capacitor C1' and the winding W1-1 of the transformer assembly 130-2 (one or more substrates of windings magnetically coupled to each other). The circuit path 611-2 includes an electrically conductive path 811-2 between the capacitor C1" and the winding W1-2 of the transformer assembly 130-2. As previously discussed, the splitting of the circuit paths results in a substantially equal current flow i11 and i12 along each of the different circuit paths 611-1 and 611-2 during circuit operation. Note that model 820 represents other circuitry associated with the power supply 100-2.

In general, the splitting of the resonant circuits as discussed herein provides equal magnitudes of current i11 and i12 to flow through respective resonant circuit paths between node N61 and node N66.

Thus, in this example, the transformer assembly 130-2 is affixed to the circuit board 810 (substrate). The circuit board 810 includes circuit node N61 and a circuit node N66. The first series circuit path (such as combination of capacitor C1' and winding W1-1) is connected between the circuit node N61 and the circuit node N66. The second series circuit path (such as combination of capacitor C1" and winding W1-2) is connected between the circuit node N61 and the circuit node N66. The circuit node N61 and the circuit node N66 connect the first circuit path and the second circuit path in parallel. If desired, the return electrically conductive path 811-3 from node N65 and node N63 to the node N66 can be combined.

Yet further, the first electrically conductive path 811-1 is disposed in the first series circuit path; the first electrically conductive path extends from a node N62 of the circuit board 810 to a layer L1 of the transformer assembly 130-2 in which the first winding W1-1 resides. The second electrically conductive path 811-2 is disposed in the second series circuit path; the second electrically conductive path extends from a node N64 of the circuit board 810 to a layer L7 of the transformer assembly 130-2 in which the second winding W1-2 resides. The first electrically conductive path 811-1 is independent of the second electrically conductive path 811-2.

As previously discussed, each of the windings W1-1, W4-1, W3-1, W2-1, W4-2, W3-2, W1-2, W4-3, W3-3, W2-2, W4-4, and W3-4 (such as in respective layers L1, L2, L3, L4, L5, L6, L7, L8, L9, L10, L11, L12) in the transformer assembly 130-2 are magnetically coupled to each other via a common magnetic core of the transformer assembly 130-2 around which the windings are wrapped. The windings W4-1, W3-1, W2-1, W4-2, W3-2 are disposed in respective layers of the transformer assembly 130-2 between the first winding W1-1 and the second winding W1-2.

Note that the transformer assembly 130-2 can be configured to include N windings magnetically coupled to each other via a common magnetic core of the transformer assembly 130-2, where N is an integer value greater than an integer value such as 4, 5, 6, 7, 8, 9, 10, 11, 12, and so on.

Yet further, the transformer assembly 130-2 can be configured to include M parallel windings (as previously discussed, the windings are all magnetically coupled to each other) disposed between the winding W1-1 and the winding W1-2, where M is an integer greater than an integer value such as 2, 3, 4, 5, 6, 7, 8, and so on.

Figure 9:
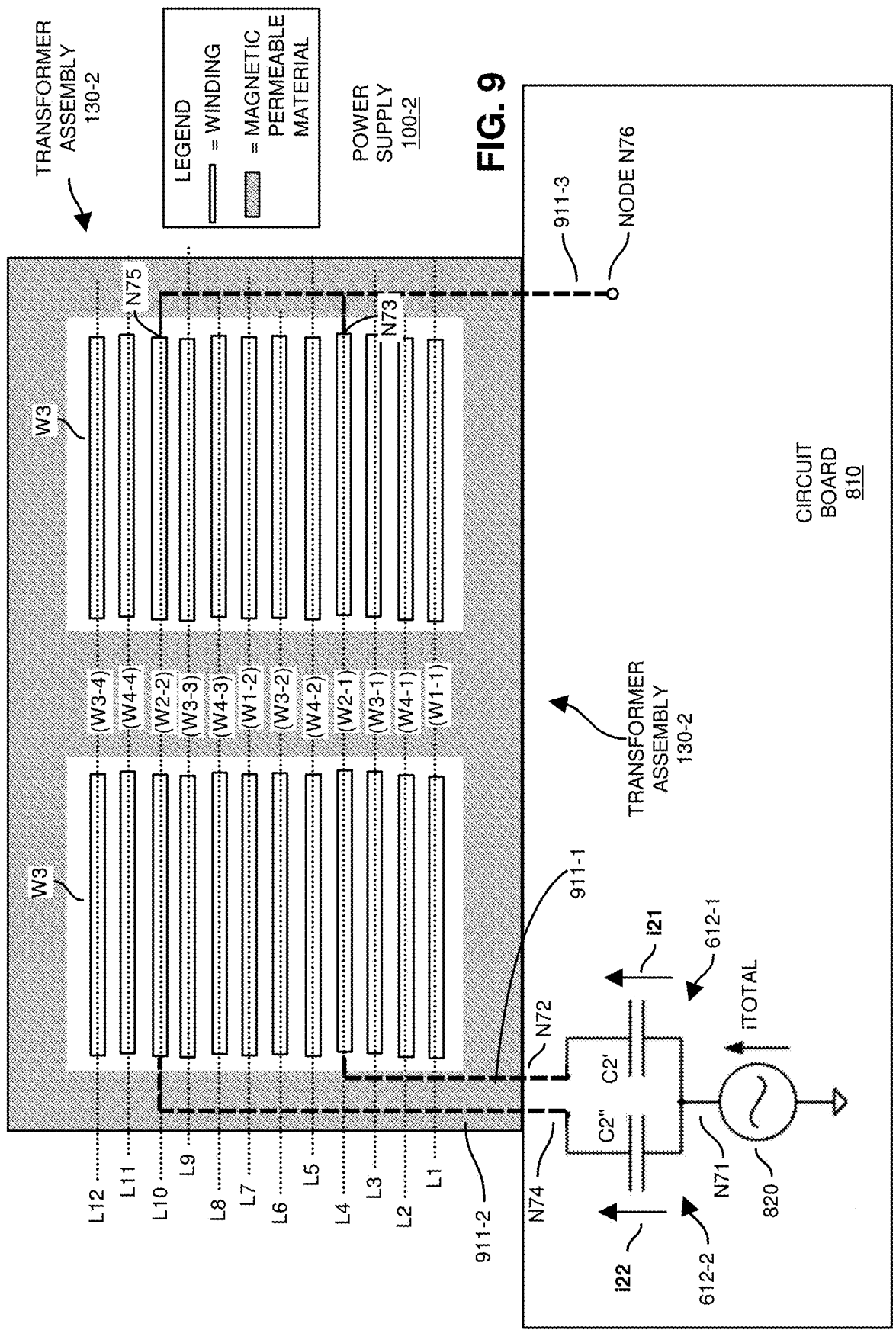
FIG. 9 is an example side view diagram of a transformer assembly and corresponding conductivity to power converter circuitry as described herein

FIG. 9 is an example side view diagram of a transformer assembly and corresponding conductivity to power converter circuitry as described herein In this example, the power supply 100-2 and corresponding components are affixed to the circuit board 810 (a.k.a., substrate or multiple substrates). The transformer assembly 130-2 is coupled to the circuit board 810 (such as in FIG. 11) or the windings of the transformer assembly 130-2 may be fabricated in the circuit board 810 (such as in FIG. 12).

Further, as shown in FIG. 9, the circuit path 612-1 includes an electrically conductive path 911-1 between the capacitor C2' and the winding W2-1 of the transformer assembly 130-2. The circuit path 612-2 includes an electrically conductive path 911-2 between the capacitor C2" and the winding W2-2 of the transformer assembly 130-2 (one or more substrates of windings magnetically coupled to each other). As previously discussed, the splitting of the circuit paths results in a substantially equal current flow i21 and i22 along each of the different circuit paths 612-1 and 612-2 during circuit operation. Note that model 820 represents other circuitry associated with the power supply 100-2. In general, the splitting of the resonant circuits as discussed herein provides equal magnitudes of current i21 and i22 to flow through respective resonant circuit paths between node N71 and node N76.

Thus, in this example, the transformer assembly 130-2 is affixed to the circuit board 810 (substrate). The circuit board 810 includes circuit node N72 and a circuit node N76. The first series circuit path (such as combination of capacitor C2' and winding W2-1) is connected between the circuit node N72 and the circuit node N76. The second series circuit path (such as combination of capacitor C2" and winding W2-2) is connected between the circuit node N71 and the circuit node N76. The circuit node N71 and the circuit node N76 connect the first circuit path and the second circuit path in parallel. If desired, the return electrically conductive path 911-3 from node N75 and node N73 to the node N76 can be combined.

Yet further, the first electrically conductive path 911-1 is disposed in the first series circuit path; the first electrically conductive path extends from a node N72 of the circuit board 810 to a layer L4 of the transformer assembly 130-2 in which the winding W2-1 resides. The second electrically conductive path 911-2 is disposed in the second series circuit path; the second electrically conductive path extends from a node N74 of the circuit board 810 to a layer L10 of the transformer assembly 130-2 in which the second winding W2-2 resides. The first electrically conductive path 911-1 is independent of the second electrically conductive path 911-2.

Thus, the power supply 100-2 can be configured to include third series circuit path including a winding W2-1 disposed in series with circuit path 911-1 and capacitor C2' between node N71 and node N76. The power supply 100-2 further includes a further series circuit path including winding W2-2 disposed in series with circuit component capacitor C2" between node N71 and node N76. The fourth series circuit path is connected in parallel with the third series circuit path external to the transformer assembly.

As previously discussed, the transformer assembly 130-2 further includes a winding W3 (such as one or more of winding W3-1, W3-2, W3-3, and W3-4 in parallel) and a winding W4 (such as winding W4-1, W4-2, W4-3, and W4-4 in parallel) connected in series. The winding W3 can be directly coupled to a node of the winding W1 (such as W1-1 and/or W1-2) and a node of the winding W4 (such as W4-1, W4-2, W4-3, and W4-4). The winding W4 can be directly coupled to a node of the winding W2 (such as W2-1 and/or W2-2) and a node of the winding W3 (such as W3-1, W3-2, W3-3, and W3-4).

Figure 10:
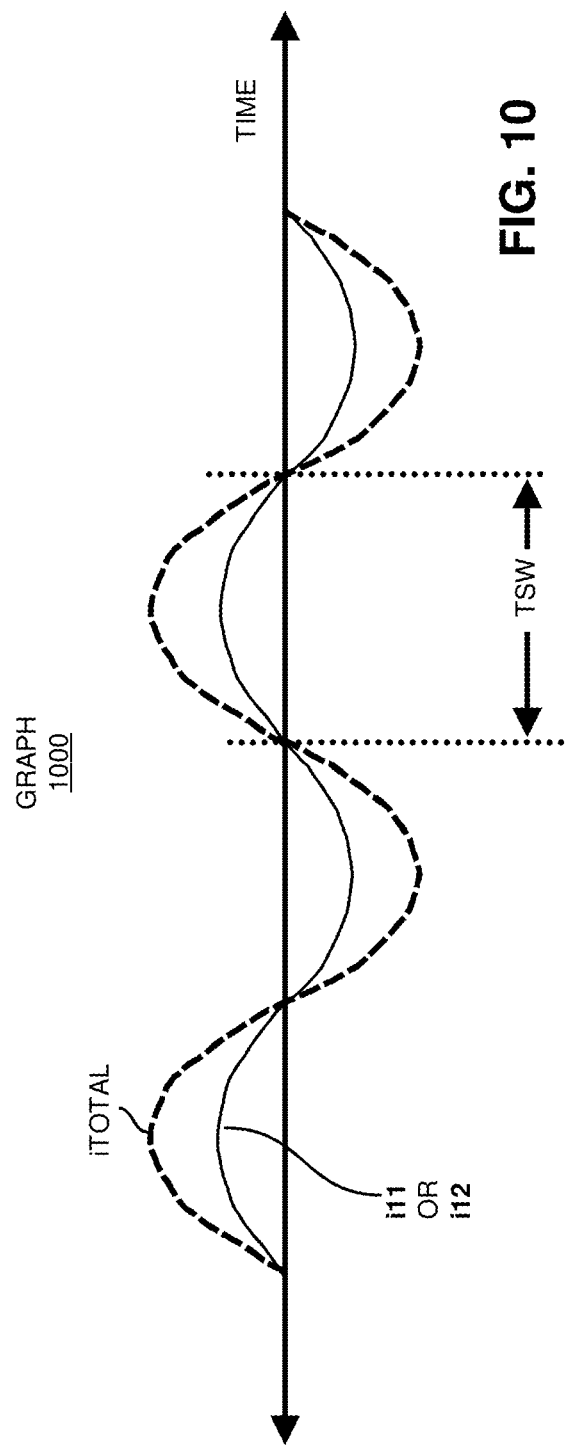
FIG. 10 is an example diagram illustrating current supplied by split resonant circuits as described herein.

FIG. 10 is an example diagram illustrating current supplied by split resonant circuits as described herein.

Graph 1000 illustrates that current i11 or current i12 through each winding W1-1 and W1-2 is half of the total current iTOTAL.

Figure 11:
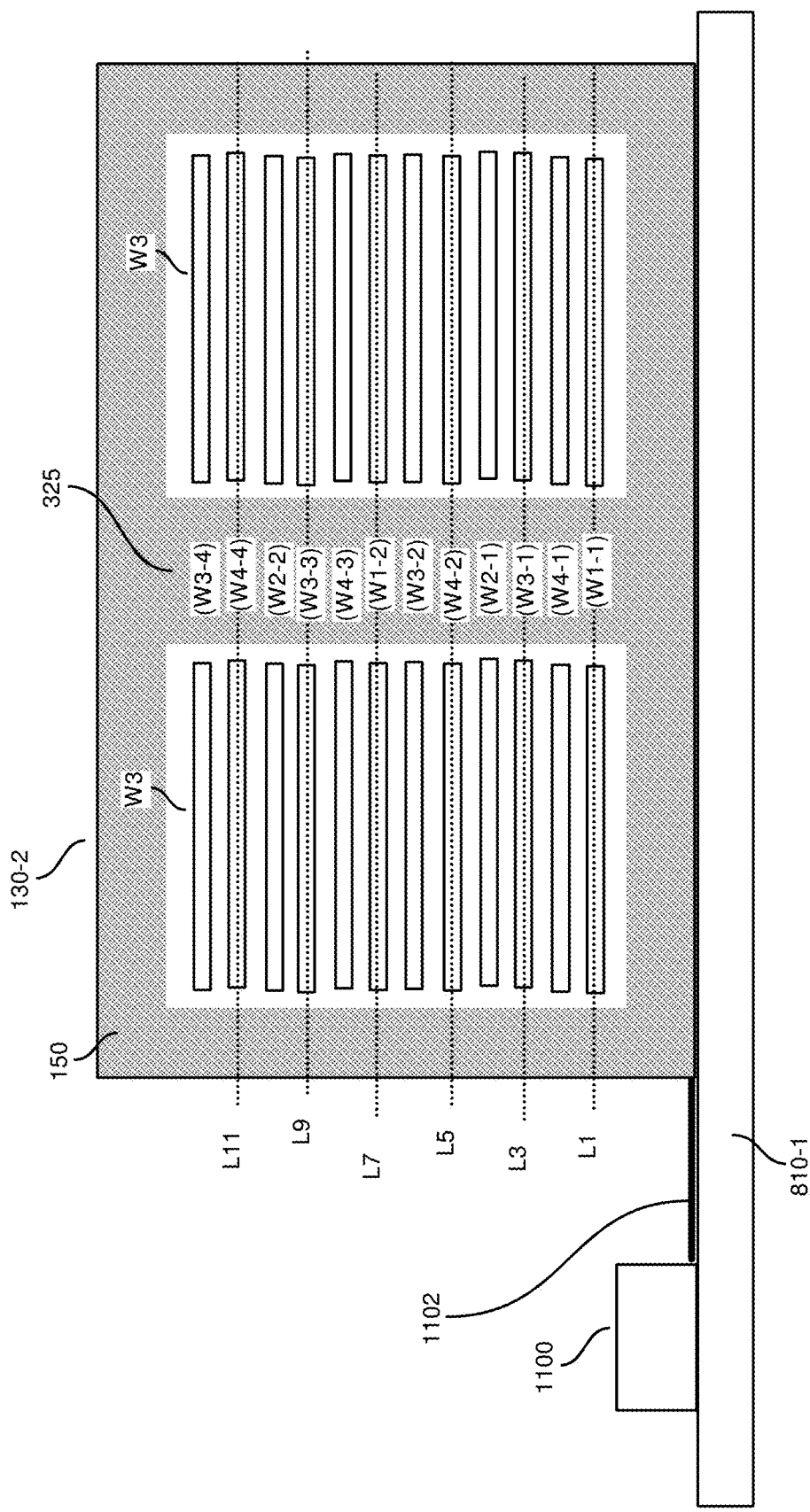
FIG. 11 is an example side view diagram of a respective power converter including a transformer assembly and corresponding circuitry affixed to a circuit board as described herein.

FIG. 11 is an example side view diagram of a respective power converter including a transformer assembly and corresponding circuitry affixed to a circuit board as described herein.

In this example, the transformer assembly 130-2 is affixed to the circuit board 810-1. The circuitry 1100 (such as one or more of components such as switches Q11, Q12, Q13, Q21, Q22, and Q23, capacitor C1', capacitor C1", capacitor C2'. capacitor C2", capacitor Cout, controller 140, etc.) can be affixed to the circuit board 810-1 as well. The circuit paths 1102 of circuit board 810-1 and/or transformer assembly 130-2 provide connectivity between nodes as discussed herein.

Figure 12:
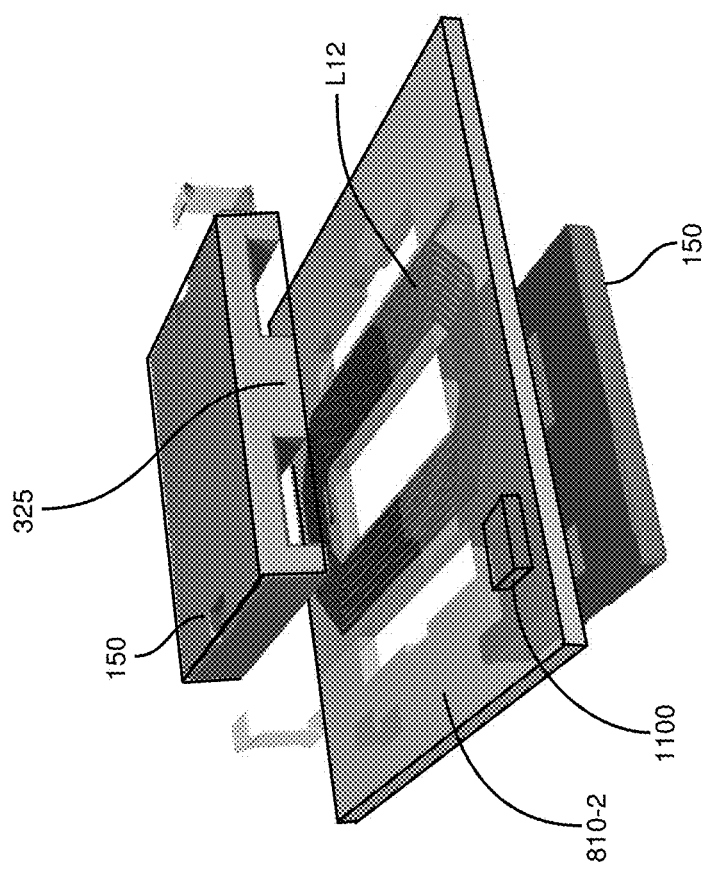
FIG. 12 is an example diagram illustrating implementation of multiple windings of a transformer assembly in a circuit board and corresponding core magnetic permeable material as described herein.

FIG. 12 is an example diagram illustrating implementation of multiple windings of a transformer assembly in a circuit board and corresponding core magnetic permeable material as described herein.

In this example, the transformer assembly 130-2 is affixed to the circuit board 810-1. The circuitry 1100 (such as one or more of components such as switches Q11, Q12, Q13, Q21, Q22, and Q23, capacitor C1', capacitor C1", capacitor C2'. capacitor C2", capacitor Cout, controller 140, etc.) can be affixed to the circuit board 810-1 as well. The circuit paths 1102 of circuit board 810-1 and/or transformer assembly 130-2 provide connectivity between nodes as discussed herein.

Accordingly, each of the multiple windings of the transformer assembly 130-2 can be configured to reside in a respective layer of the circuit board 810-2. The power supply 100-2 (power converter circuit) can be fabricated on the circuit board 810-1 (substrate).

Figure 13:
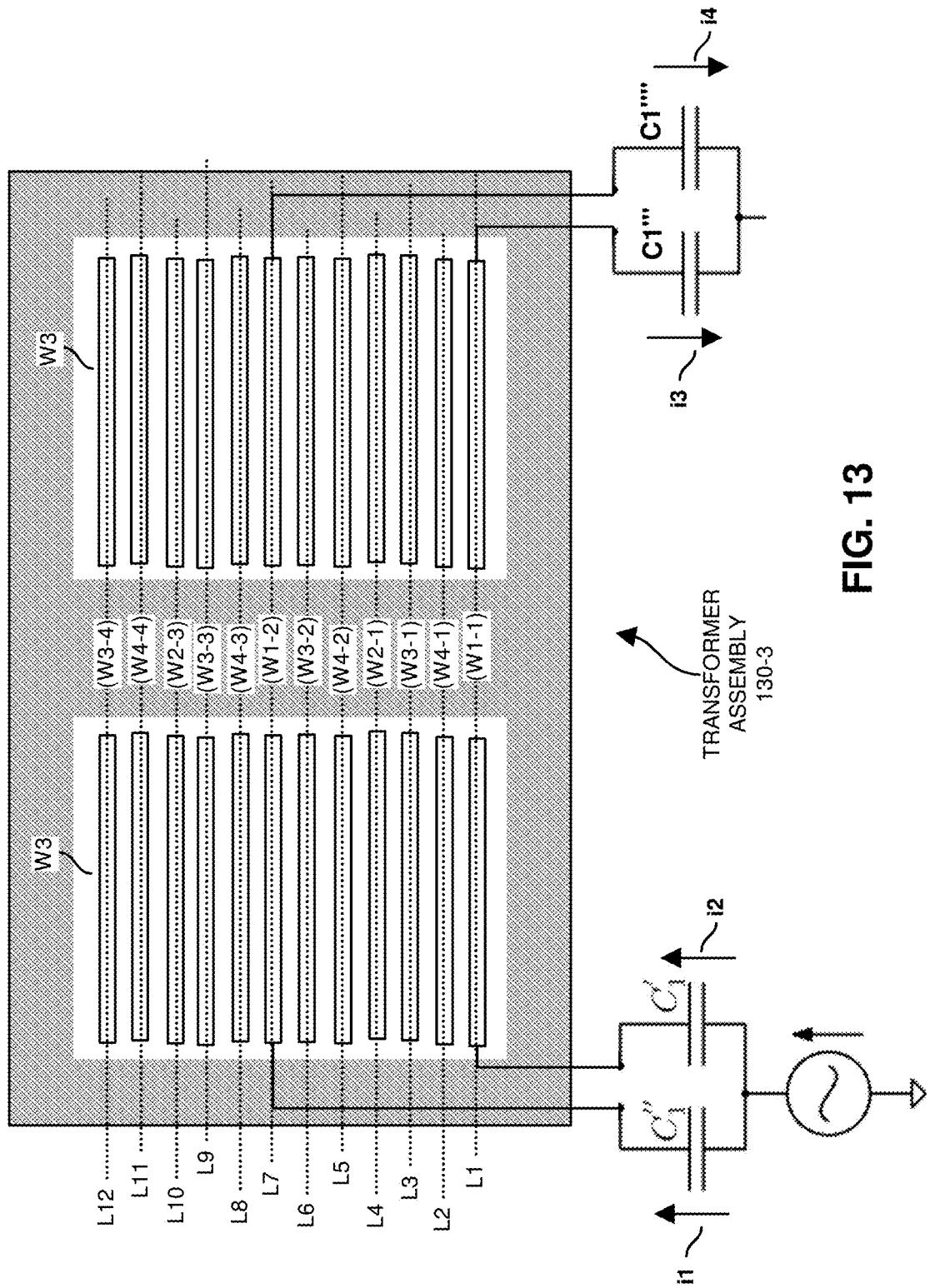
FIG. 13 is an example side view diagram illustrating another implementation of a power converter including the transformer assembly in corresponding resonant circuitry as described herein.

FIG. 13 is an example side view diagram illustrating another implementation of a power converter including the transformer assembly in corresponding resonant circuitry as described herein.

Note that the return path can be configured to include a split resonant circuit path as well. For example, in this example embodiment, the circuit includes a first series circuit path including circuit component capacitor C1''' disposed in series with winding W1-1. The circuit includes a second series circuit path including circuit component capacitor C1'''' disposed in series with winding W1-2.

In such an instance, the winding W1-1 is disposed between the first circuit component capacitor C1' and the circuit component capacitor C1'''; the winding W1-2 is disposed between the circuit component capacitor C1" and the circuit component capacitor C1''''.

Figure 14:
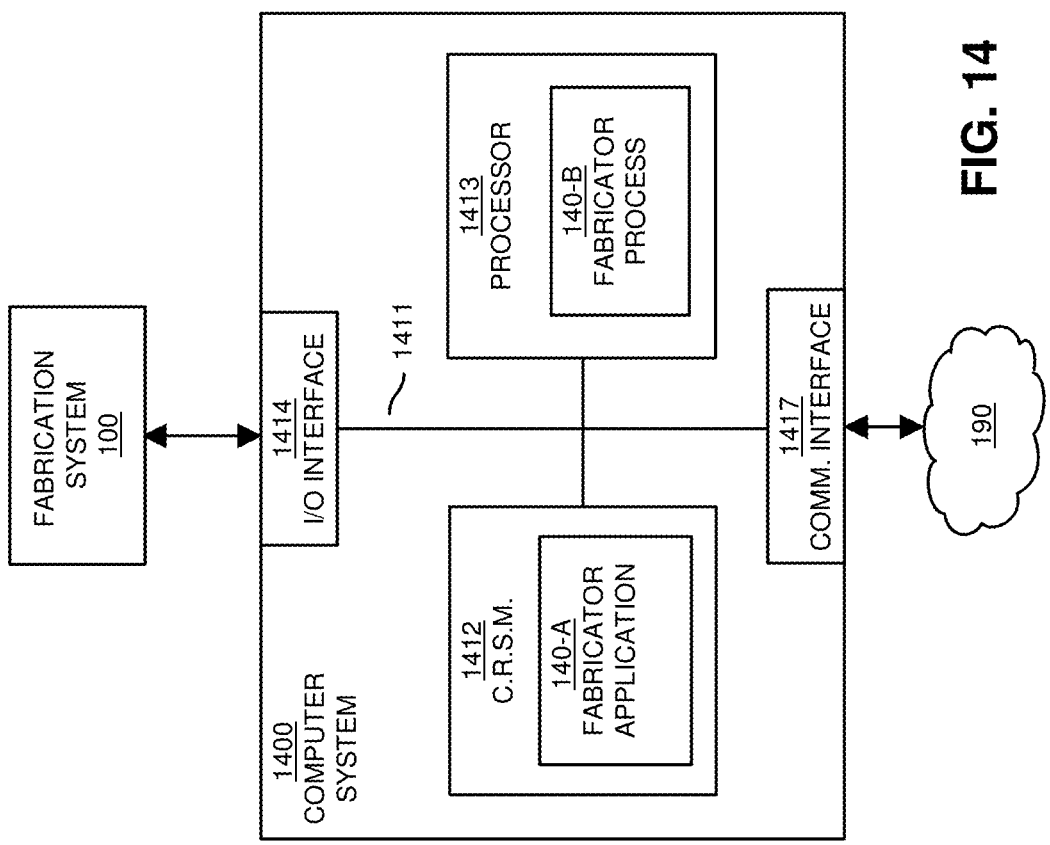
FIG. 14 is an example diagram illustrating example computer architecture operable to execute one or more operations as discussed herein.

FIG. 14 is an example block diagram of a computer system for implementing any of the operations as previously discussed according to embodiments herein.

Any of the resources (such as a fabrication system, etc.) as discussed herein can be configured to include computer processor hardware and/or corresponding executable instructions to carry out the different operations as discussed herein.

As shown, computer system 1450 of the present example includes an interconnect 1411 coupling computer readable storage media 1412 such as a non-transitory type of media, hardware storage medium in which digital information can be stored and retrieved, etc., a processor 1413 (computer processor hardware), I/O interface 1414, and a communications interface 1417.

I/O interface(s) 1414 supports connectivity to repository 1480 and input resource 1492.

Computer readable storage medium 1412 can be any hardware storage device such as memory, optical storage, hard drive, floppy disk, etc. In one embodiment, the computer readable storage medium 1412 stores instructions and/or data.

As shown, computer readable storage media 1412 can be encoded with communication management application 140-1 (e.g., including instructions) to carry out any of the operations as discussed herein.

During operation of one embodiment, processor 1413 accesses computer readable storage media 1412 via the use of interconnect 1411 in order to launch, run, execute, interpret or otherwise perform the instructions in communication with bank letters the check. For the bank account management application 140-1 stored on computer readable storage medium 1412. Execution of the communication management application 140-1 produces communication management process 140-2 to carry out any of the operations and/or processes as discussed herein.

Those skilled in the art will understand that the computer system 1450 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless base station, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1450 may reside at any location or can be included in any suitable resource in any network environment to implement functionality as discussed herein.

Functionality supported by the different resources will now be discussed via flowchart in FIG. 15. Note that the steps in the flowcharts below can be executed in any suitable order.

Figure 15:
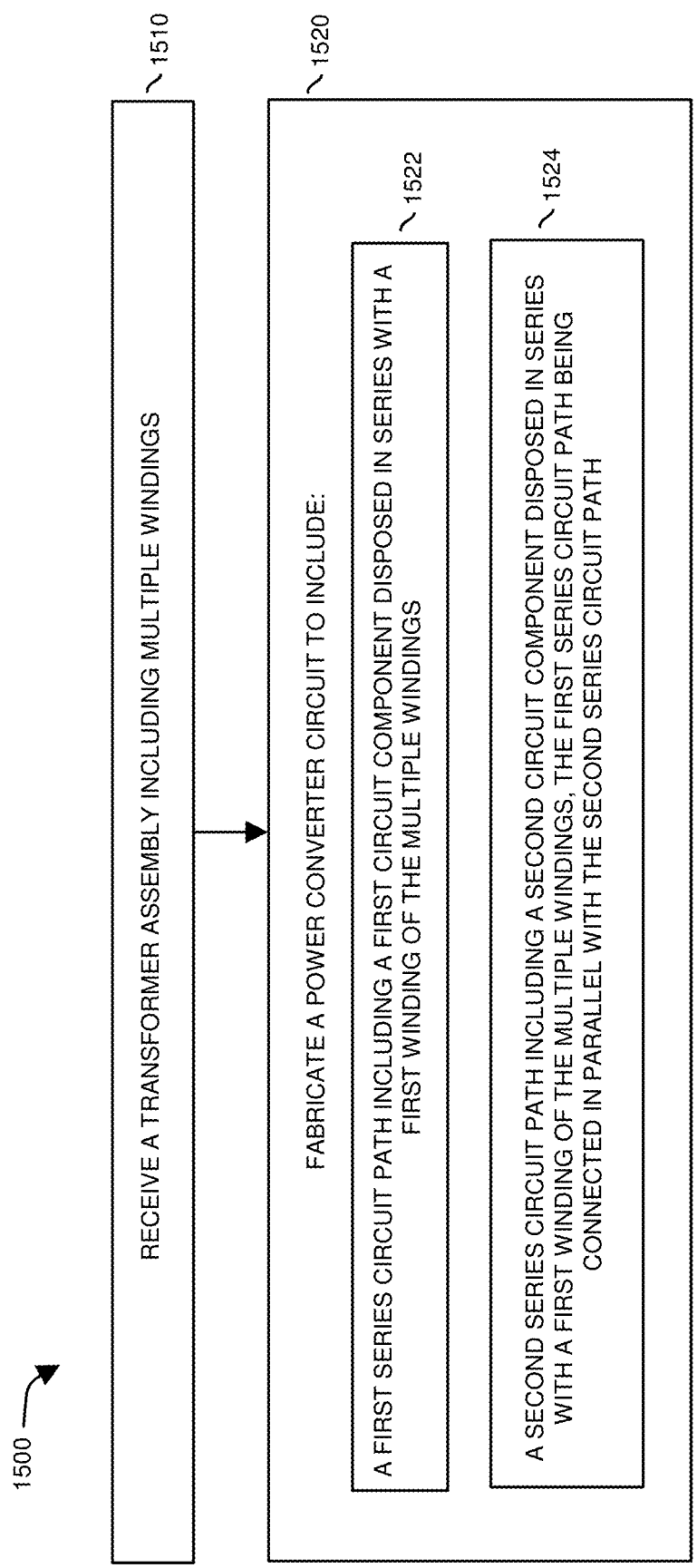
FIG. 15 is an example diagram illustrating a general method as described herein.

FIG. 15 is a flowchart 1500 illustrating an example method as discussed herein. Note that there will be some overlap with respect to concepts as discussed above.

In processing operation 1510, the fabricator 150 receives a transformer assembly including multiple windings.

In processing operation 1520, the fabricator 150 fabricates a power converter circuit to include: (1522) a first series circuit path including a first circuit component disposed in series with a first winding of the multiple windings; and (1524) a second series circuit path including a second circuit component disposed in series with a first winding of the multiple windings, the first series circuit path being connected in parallel with the second series circuit path.

Note again that techniques herein are well suited for use in power supply applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. An apparatus comprising:
   a transformer assembly including multiple windings, the multiple windings including N windings magnetically coupled to each other via a common magnetic core of the transformer assembly, where N is greater than 2;
   a first series circuit path including a first circuit component disposed in series with a first winding of the multiple windings;
   a second series circuit path including a second circuit component disposed in series with a second winding of the multiple windings;
   the first series circuit path connected in parallel with the second series circuit path;
   wherein the first circuit component is a first capacitor;
   wherein the second circuit component is a second capacitor;
   wherein the first series circuit path includes a first circuit node directly connecting a first terminal of the first capacitor to a first terminal of the first winding;
   wherein the second series circuit path includes a second circuit node directly connecting a first terminal of the second capacitor to a first terminal of the second winding; and
   the apparatus further comprising: a third circuit node directly connecting a second terminal of the first capacitor and a second terminal of the second capacitor; and a fourth circuit node directly connecting a second terminal of the first winding to a second terminal of the second winding.

2. The apparatus as in claim 1, wherein the first series circuit path includes a first resonant circuit, the first circuit component disposed in the first resonant circuit; and
   wherein the second series circuit path includes a second resonant circuit, the second circuit component disposed in the second resonant circuit.

3. The apparatus as in claim 1 further comprising:
   one or more substrates; and
   wherein each of the multiple windings of the transformer assembly reside in a respective layer of the one or more substrates.

4. The apparatus as in claim 3, wherein the first circuit component and the second circuit component are affixed to a respective host substrate.

5. The apparatus as in claim 4 further comprising:
   a power converter circuit fabricated on the one or more substrates;
   wherein the first capacitor resides in the power converter circuit; and
   wherein the second capacitor resides in the power converter circuit.

6. The apparatus as in claim 1, wherein the transformer assembly is an auto-transformer assembly.

7. The apparatus as in claim 1 further comprising:
   a third circuit component disposed in the first series circuit path, the first winding disposed between the first circuit component and the third circuit component; and
   a fourth circuit component disposed in the second series circuit path, the second winding disposed between the second circuit component and the fourth circuit component.

8. The apparatus as in claim 1 further comprising:
   one or more substrates to which the transformer assembly is affixed;
   the one or more substrates including a first circuit node and a second circuit node;
   wherein the first series circuit path is connected between the third circuit node and the fourth circuit node;
   wherein the second series circuit path is connected between the third circuit node and the fourth circuit node; and wherein a combination of the third circuit node and the fourth circuit node directly connect the first circuit path and the second circuit path in parallel.

9. The apparatus as in claim 8 further comprising:
a first electrically conductive path disposed in the first series circuit path, the first electrically conductive path extending from the first capacitor to a first layer of the transformer assembly in which the first winding resides; and
a second electrically conductive path disposed in the second series circuit path, the second electrically conductive path extending from the second capacitor to a second layer of the transformer assembly in which the second winding resides, the first electrically conductive path independent of the second electrically conductive path.

10. The apparatus as in claim 1, wherein the transformer assembly includes a third winding magnetically coupled to the first winding and the second winding; and
wherein the third winding is disposed in a layer of the transformer assembly between the first winding and the second winding.

11. The apparatus as in claim 1, wherein the transformer assembly includes M windings disposed in parallel between the first winding and the second winding, where M is greater than 2.

12. The apparatus as in claim 1, wherein the common magnetic core is fabricated to include magnetically permeable material; and
wherein the multiple windings are disposed in a stack, each of the multiple windings disposed at a respective planar layer in the stack.

13. The apparatus as in claim 12, wherein each respective planar layer in the stack is a corresponding layer of a circuit board.

14. The apparatus as in claim 13, wherein the circuit board includes a first opening through which the common magnetic core passes.

15. The apparatus as in claim 1, wherein the transformer assembly includes an assembly of magnetically permeable material;
wherein the common magnetic core is disposed in the assembly of magnetically permeable material;
wherein the assembly of magnetically permeable material further includes a first portion of magnetically permeable material and a second portion of magnetically permeable material; and
wherein the common magnetic core is disposed between the first portion of magnetically permeable material and the second portion of the magnetically permeable material.

16. The apparatus as in claim 15, wherein each of the multiple windings passes through: i) a first spacing between the first portion of magnetically permeable material and the common magnetic core, and ii) a second spacing between the second portion of magnetically permeable material and the common magnetic core.

17. The apparatus as in claim 1, wherein the multiple windings are disposed in layers of a stack;
wherein the first winding is disposed in a first planar layer of the stack;
wherein the second winding is disposed in a second planar layer of the stack;
wherein the first series circuit path includes a first electrically conductive path extending from the first winding in the first planar layer of the stack to the first capacitor;
wherein the second series circuit path includes a second electrically conductive path extending from the second winding in the second planar layer of the stack to the second capacitor, the second electrically conductive path being independent of the first electrically conductive circuit path; and
wherein a length of the first electrically conductive path is shorter than a length of the second electrically conductive path.

18. The apparatus as in claim 1, wherein the first circuit node is electrically disconnected from the second circuit node.

19. The apparatus as in claim 1, wherein the multiple windings include a third winding;
wherein the fourth circuit node directly connects a first terminal of the third winding to the second terminal of the first winding; and
wherein the fourth circuit node directly connects the first terminal of the third winding to the second terminal of the second winding.

* * * * *